United States Patent [19]
Kornreich et al.

[11] 4,063,281
[45] Dec. 13, 1977

[54] MOTION DETECTION EMPLOYING DIRECT FOURIER TRANSFORMS OF IMAGES

[75] Inventors: Philipp G. Kornreich, North Syracuse; Stephen T. Kowel, Liverpool, both of N.Y.

[73] Assignee: Research Corporation, New York, N.Y.

[21] Appl. No.: 499,606

[22] Filed: Aug. 22, 1974

Related U.S. Application Data

[60] Continuation-in-part of Ser. No. 493,990, Aug. 1, 1974, Ser. No. 365,054, May 30, 1973, Pat. No. 3,836,712, and Ser. No. 434,102, Jan. 17, 1974; said Ser. No. 493,990, and Ser. No. 434,102, each is a continuation-in-part of Ser. No. 319,680, Dec. 29, 1972, abandoned, said Ser. No. 365,054, is a division of Ser. No. 319,680.

[51] Int. Cl.² .................... H04N 3/10; H04N 5/74; G08B 13/24; H01L 41/08
[52] U.S. Cl. .................... 358/105; 358/201; 358/235; 340/258 R; 250/211 R; 310/313
[58] Field of Search .......... 178/6, 7.1, 7.6, DIG. 33; 340/146.3 R, 146.3 P, 258 R, 258 D; 250/211 J, 211 R, 578; 310/8.1, 8, 9.7, 8.3; 315/55; 358/201, 213, 105

[56] References Cited

U.S. PATENT DOCUMENTS

| | | | |
|---|---|---|---|
| 1,997,371 | 4/1935 | Loiseau | 178/6 |
| 3,065,378 | 11/1962 | Zaks | 315/55 |
| 3,202,824 | 8/1965 | Yando | 315/55 |
| 3,202,827 | 8/1965 | Robinson | 250/566 |
| 3,446,974 | 5/1969 | Seiwatz | 310/8.1 |
| 3,446,975 | 5/1969 | Adler et al. | 310/8.1 |
| 3,453,595 | 7/1969 | Barrekette et al. | 315/55 |
| 3,507,992 | 4/1970 | Foote | 178/DIG. 33 |
| 3,561,870 | 2/1971 | Redpath | 178/DIG. 33 |
| 3,603,729 | 9/1971 | Sperber | 178/DIG. 33 |
| 3,826,865 | 7/1974 | Quate et al. | 178/7.1 |
| 3,826,866 | 7/1974 | Quate et al. | 178/7.1 |
| 3,836,712 | 9/1974 | Kornreich et al. | 178/7.1 |

FOREIGN PATENT DOCUMENTS 1,150,625   2/1966   United Kingdom.

*Primary Examiner*—John C. Martin
*Attorney, Agent, or Firm*—Cooper, Dunham, Clark, Griffin & Moran

[57] ABSTRACT

Method and apparatus for directly converting between an image and the spatial or temporal Fourier transform thereof. To convert an image into its Fourier transform representation, the image interacts with strain waves in media that have electrical properties varying as a function of both the intensity pattern of the image and strain waves in the media. The electrical properties are measured to derive signals representing Fourier series terms defining the image. The derived signals are used to detect motion (including motion in the plane of the image), for image stabilization and scaling, and for pattern recognition. A new DEFT device (Direct Electronic Fourier Transform) obtains a Fourier transform representation of an image by utilizing photon assisted tunnelling current through an isolator film junction between two thin conductor films. Another new DEFT device provides spatial scanning similar to television raster scanning but utilizing completely different principles. Still another new DEFT device generates a two-dimensional spatial Fourier transform representation of an image without the need for two-dimensional scanning of the strain wave. An image is reconstructed from electrical signals obtained as described above by interacting uniform (but not necessarily coherent) light with strain waves that are a function of these electrical signals.

36 Claims, 20 Drawing Figures

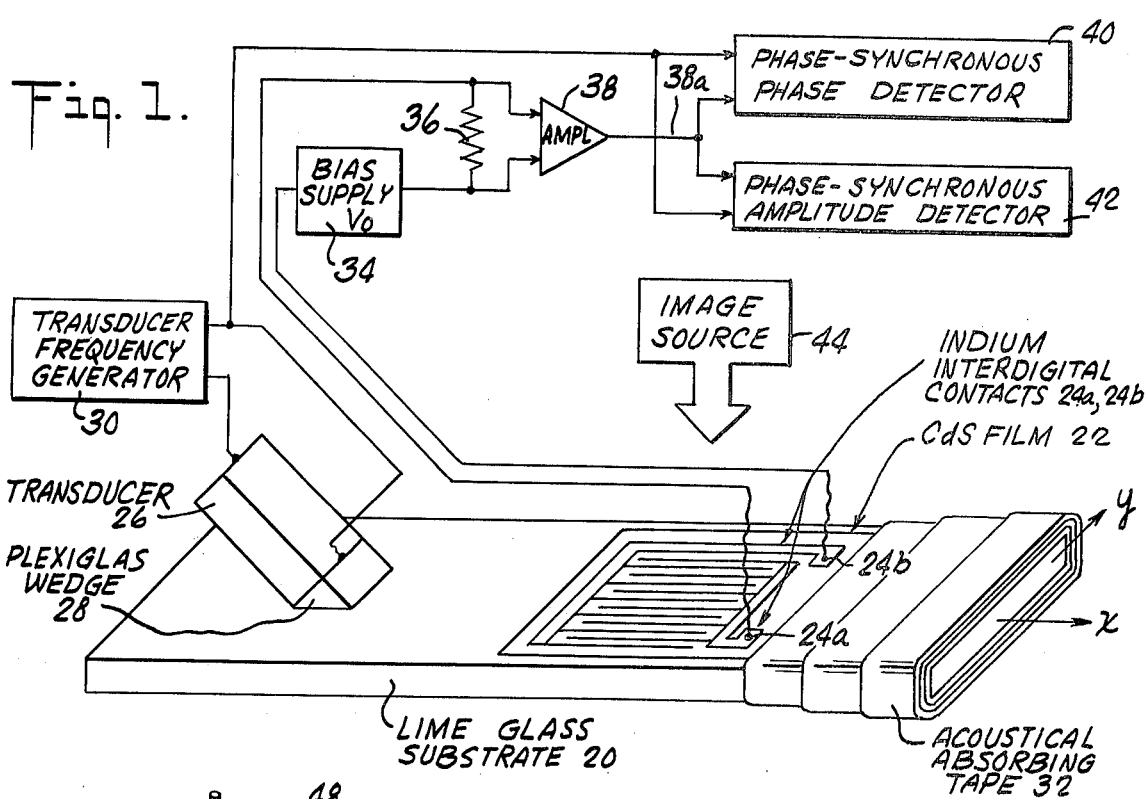
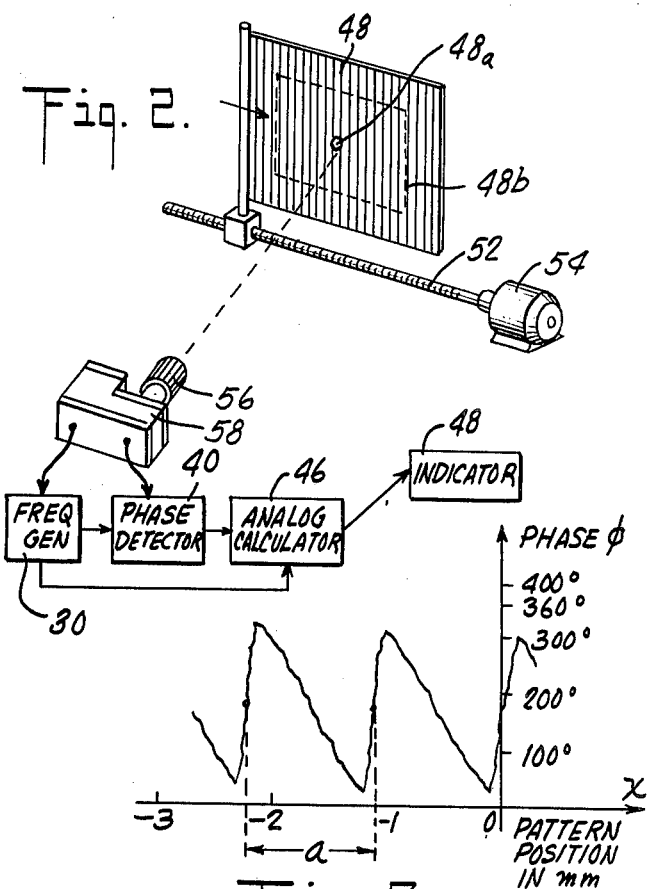
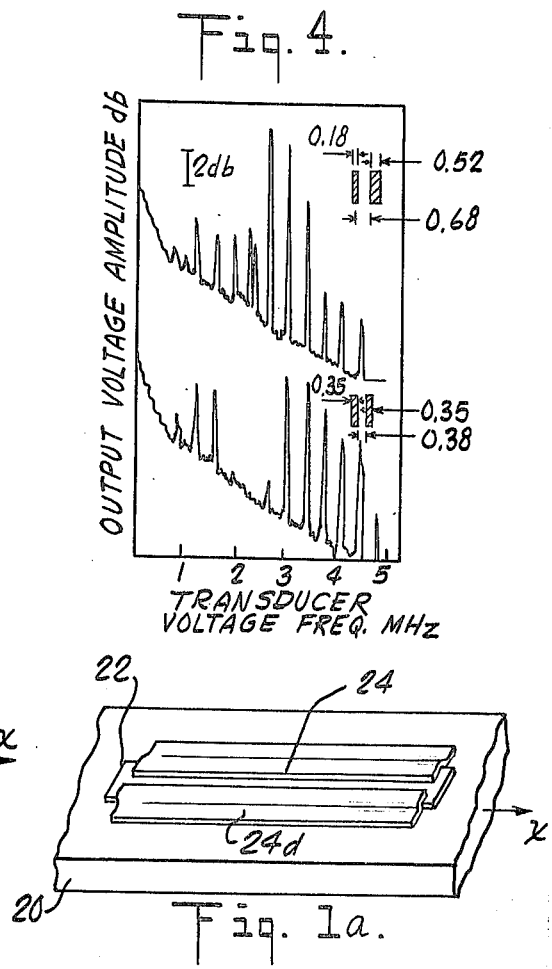

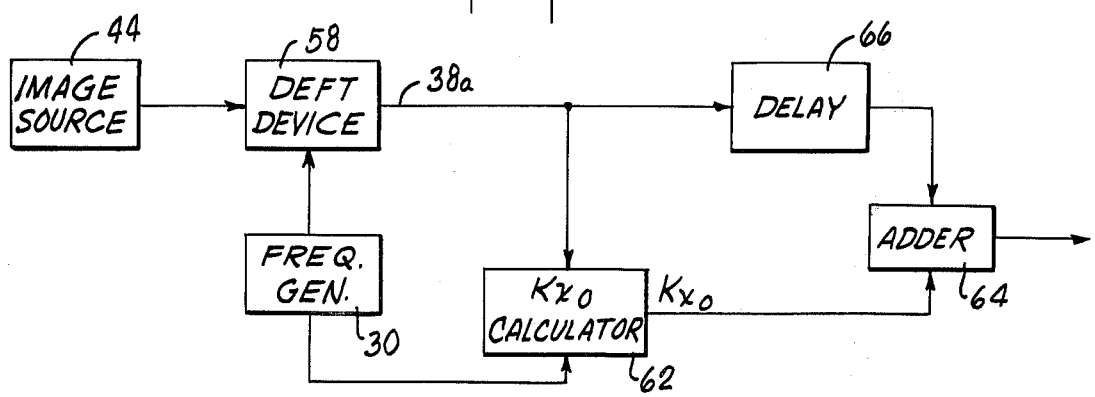
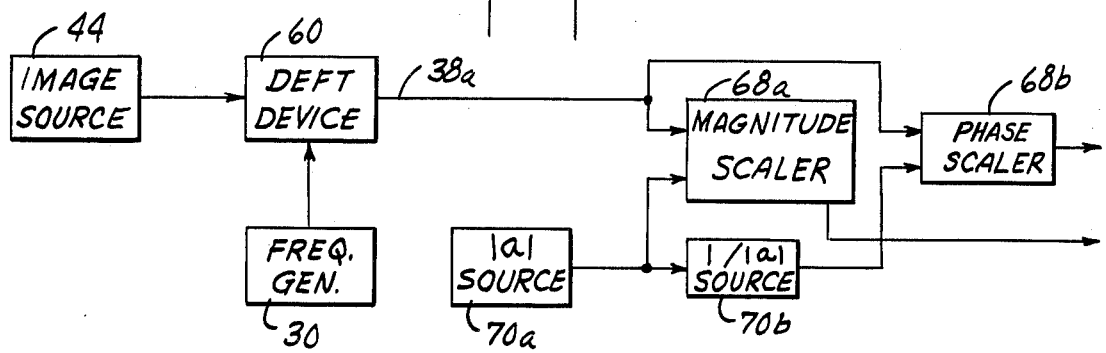
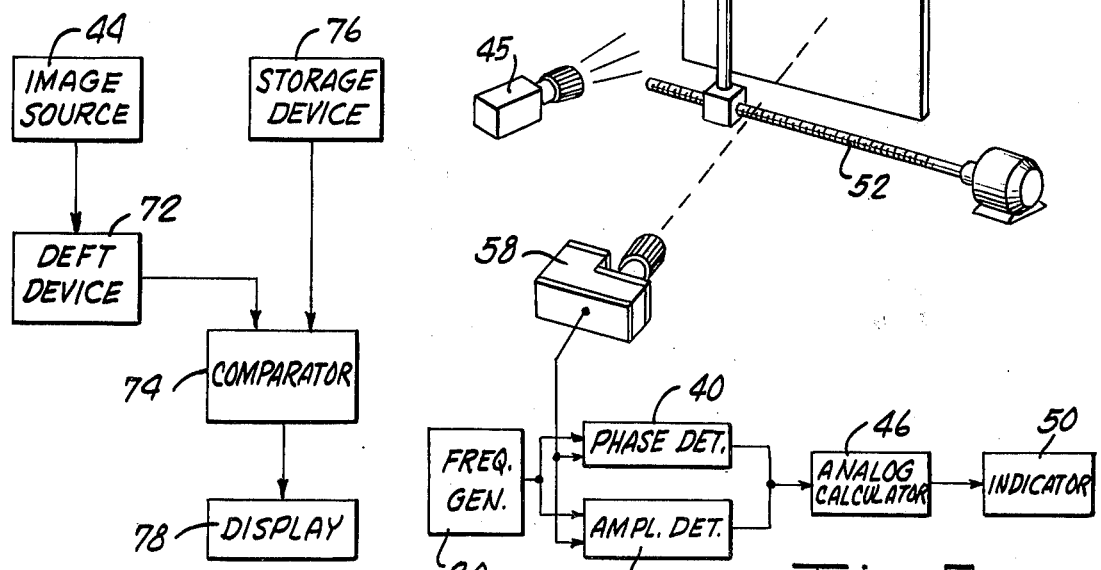

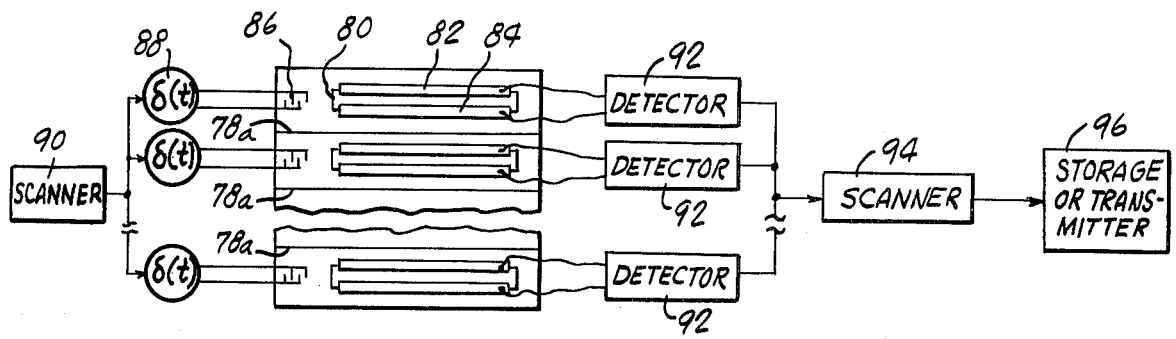
Fig. 6.
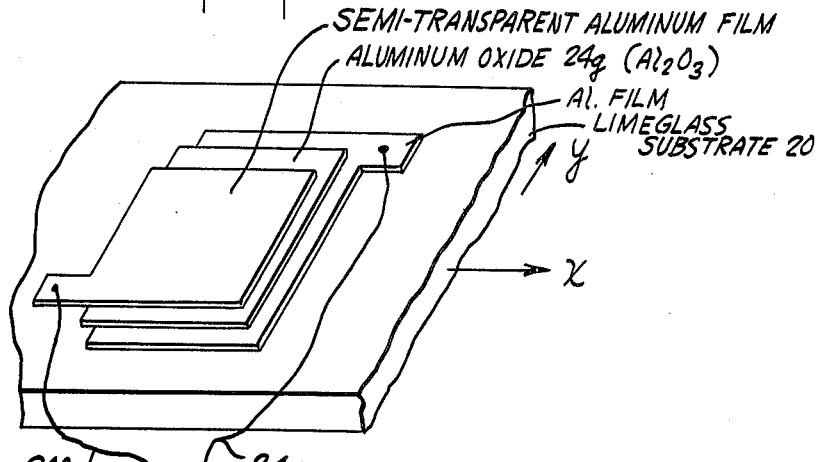
Fig. 7.
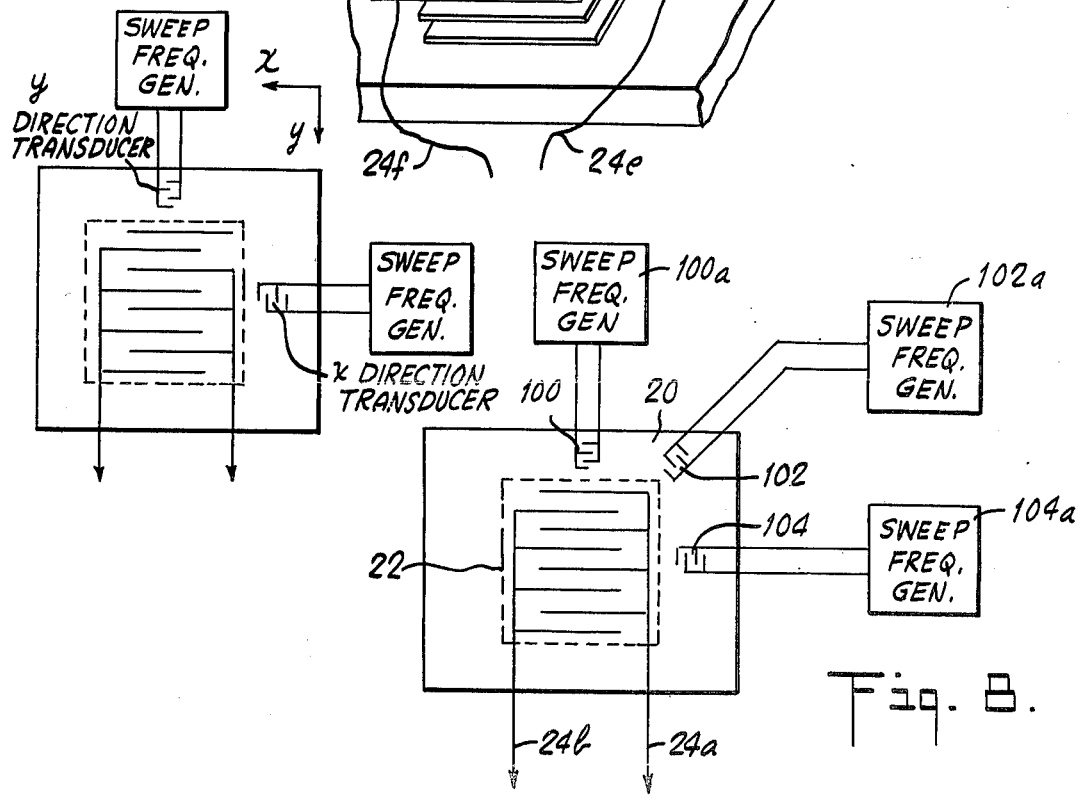
Fig. 2d.
Fig. 8.

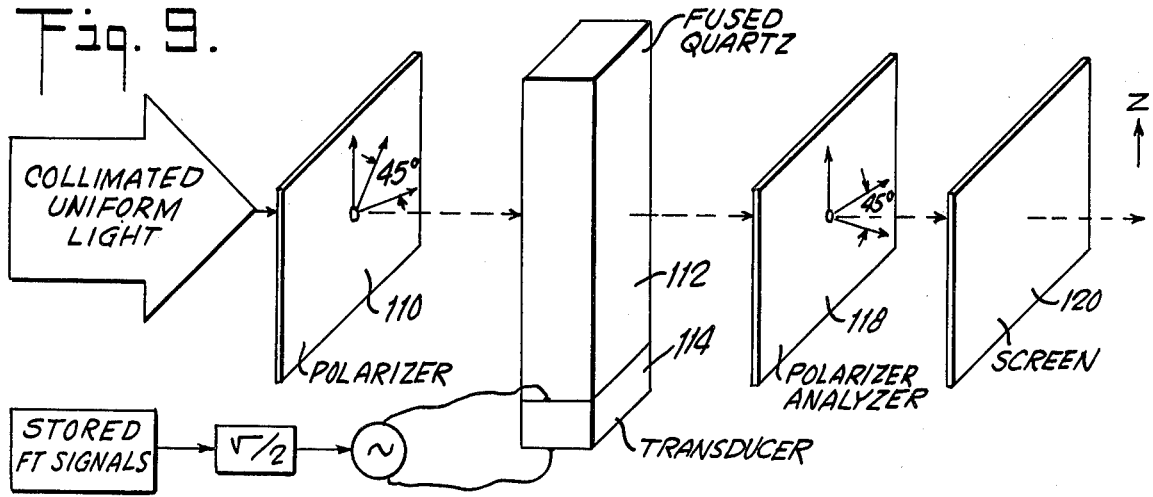
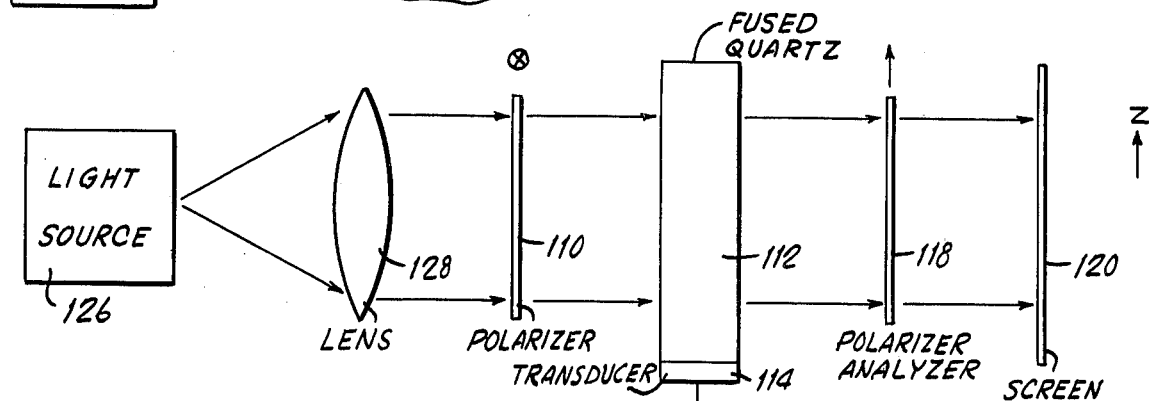
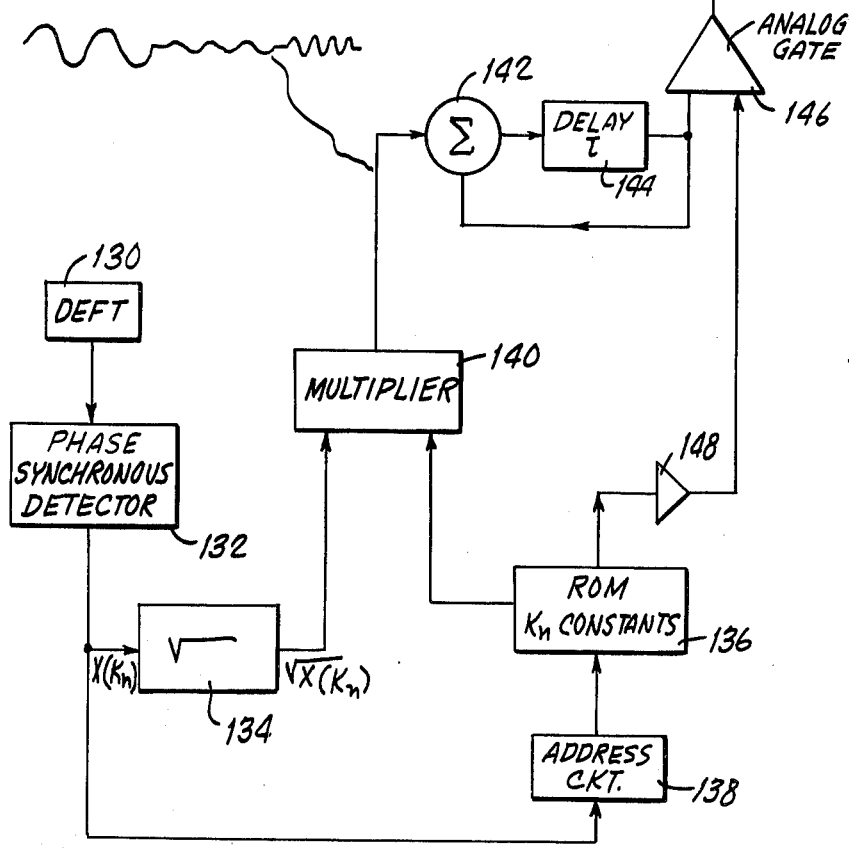

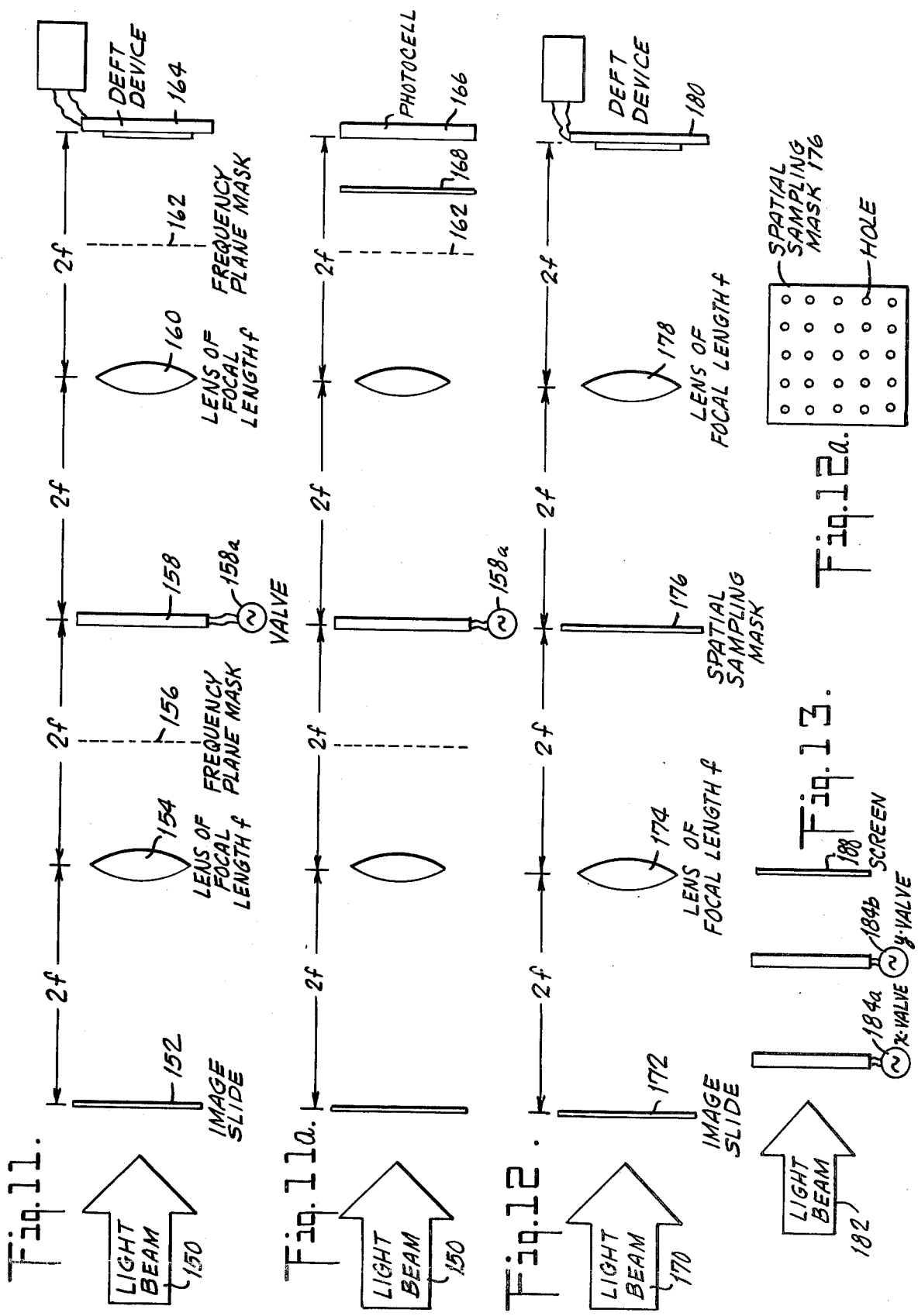

MOTION DETECTION EMPLOYING DIRECT FOURIER TRANSFORMS OF IMAGES

REFERENCE TO RELATED APPLICATIONS

This application is a continuation-in-part of the following patent applications filed by the same inventors and now pending:
1. Ser. No. 493,990, filed on Aug. 1, 1974 as continuation of Ser. No. 319,680 (now abandoned) filed on Dec. 29, 1972;
2. Ser. No. 365,054 (now U.S. Pat. No. 3,836,712), filed on May 30, 1973 as division of Ser. No. 319,680 (now abandoned) filed on Dec. 29, 1972; and
3. Ser. No. 434,102, filed on Jan. 17, 1974 as continuation-in-part of Ser. No. 319,680 (now abandoned) filed on Dec. 29, 1972.

The above three co-pending patent applications (including any subject matter incorporated therein by reference or otherwise) are hereby incorporated by reference.

The following patent applications have been filed abroad by applicants or applicants' representatives or assigns:

based on said U.S. application Ser. No. 319,680:

| Country | Ser. No. | Filed |
| --- | --- | --- |
| Canada | 182,191 | Sept. 28, 1973 |
| France | 73.34,793 | Sept. 28, 1973 |
| Gt. Britain | 45,011/73 | Sept. 26, 1973 |
| Holland | 13,380 | Sept. 28, 1973 |
| Italy | 52,564A/73 | Sept. 11, 1973 |
| Japan | 108,065/73 | Sept. 27, 1973 |
| W. Germany | P 23 483 85.4 | Sept. 26, 1973 |
| U.S.S.R. | 1959357/18-24 | Sept. 28, 1973 |
| U.S.S.R. | 2044412/18-24 | July 9, 1974 | based on said U.S. application Ser. No. 434,102:

| Country | Ser. No. | Filed |
| --- | --- | --- |
| Austria | 11 A 8213/74 | Oct. 11, 1974 |
| Canada | 211,440 | Oct. 15, 1974 |
| Gt. Britain | 41675/74 | Sept. 25, 1974 |
| Japan | 118331/74 | Oct. 8, 1974 |
| W. Germany | P 24 47 914.9 | Oct. 8, 1974 |

BACKGROUND OF THE INVENTION

The invention is in the field of converting between pictorial information and electrical signals representing that information, and relates specifically to converting between images and Fourier transform representations thereof, and to utilizing such conversion.

Electronic processing of pictorial information is an active field, and there are many devices for converting between pictorial information and electrical representations thereof. The electrical representations are generally obtained by spatial scanning in which the electrical signal at any particular time represents the image intensity at a point on the image, e.g., TV-type scanning, but there are also devices which provide a Fourier transform representation of images. Such Fourier transform representation is desirable because it allows for more efficient and more versatile electronic processing of pictorial information, such as for improving image resolution, removing noise, providing electronic zoom, bandwidth compression, etc. In the most common approach to obtaining the Fourier transform of an image, a television camera scans an image spatially, point-by-point, and a computer computes a Fourier transform of the electrically represented light intensity pattern. Depending on the purpose of the information, the computer can compute the Fast Fourier, the Hadamand or other transforms. The difficulty with this approach is the amount of computation which must take place. For example, to compute the Fast Fourier transform of an image array that is 128 by 128 image points, it is necessary to perform over 200,000 computations, plus the reordering of a 128 by 128 complex-valued matrix. Assuming an average information retrievel and computation time of 4 microseconds per computation for a contemporary digital computer, this would take nearly a second. Other prior art approaches use vacuum TV camera tubes or charge coupled devices, but the difficulty of this is limited resolution. Still another approach is the use of optical lenses, but only the magnitude of the Fourier transform is obtained by this approach while the phase information is lost.

There is only one other prior art device known to applicants that may be able to generate electronically the Fourier transform of a one-dimensional pattern inversely proportional to the light intensity. This device has been developed recently at Stanford University by Professors Kino and Quate and consists of a piezoelectric substrate such as $LiNiO_3$ with an interdigital transducer at each end and a silicon plate suspended 1000 Angstroms above the substrate. An electron current in the silicon plate interacts with the surface acoustic waves on the substrate. The acoustic waves are amplified wherever the electron drift velocity exceeds the surface wave velocity. Light incident on the silicon plate increases the available charge carriers and thus decreases the necessary charge carrier drift velocity to maintain a constant current. Thus, wherever the silicon plate is illuminated, the surface wave is amplified less. This process also allows the interaction of two acoustic waves. A signal corresponding to the amplitude of the Fourier transform of the light pattern on the silicon plate is sensed at one of the interdigital transducers. An essential part of this device is the 1000 Angstrom air gap between the silicon plate and the substrate, which makes it difficult to fabricate and to maintain in alignment.

There are difficulties with each of the prior art devices discussed above that obtain a Fourier transform (FT) representation of pictorial information, and there is still a need to obtain such representation in a more simple and a more efficient manner, so that FT represented images can find even wider use than now.

It is further desirable to find a way to convert from FT represented images to image intensity patterns directly rather than through the use of computers that calculate the inverse Fourier transform and drive a conventional CRT display.

SUMMARY OF THE INVENTION

The invention is in the field of converting between pictorial information and electrical signals representing the pictorial information, and relates specifically to converting between images and Fourier transform representations of the images. The invention relies on an interaction of strain disturbances in media having certain properties and an image incident on the medium, and utilizes this interaction in fields such as motion detection, pattern recognition and the like, and in new devices.

Specifically, since the invented DEFT devices provide a Fourier transform (FT) representation of an image, and since phase shift changes in such FT represenation are indicative of motion within that image, it is possible in accordance with the invention to detect motion, including motion transverse to the viewing axis, which is difficult or impossible to detect with prior art devices. Additionally, since the invented DEFT devices generate a Fourier transform representation of an image, it is convenient to expand or reduce the image size by multiplying the frequency of its FT representation by a selected constant and the magnitude by the inverse of that constant, and to stabilize an image by adding or subtracting a term to the frequency content of its FT representation. The invented DEFT devices are useful in pattern recognition because each of the electrical signals generated by them represents the entire image, rather than a portion of the image, and only as many electrical signals (Fourier series components) have to be generated as the required resolution for a particular pattern recognition use. If a relatively few images have to be compared and distinguished from each other, such as the letters of the alphabet, only a few electrical signals need be generated in accordance with the invention. When excited by a short pulse (or a short burst) rather than with a continuous wave, the output of the invented devices is similar to the output of conventional spatial scanning devices, such as television cameras, and may be used in a similar manner. The invented principles are applicable to new devices, such as devices utilizing the Franz-Keldish effect and devices utilizing tunneling across an isolator to get a FT representation of a 2-dimensional image. Additionally, this invention relates to interacting a FT representation of an image with uniform (but not necessarily coherent) light to reconstruct the original image. The invented devices for obtaining FT representation of images are called in this specification DEFT devices (for Direct Electronic Fourier Transform), and the invented devices for obtaining an image from its FT representation are called reconstruction devices.

BRIEF DESCRIPTION OF THE DRAWINGS

FIG. 1 illustrates a device of the invented type including a pair of interdigital contacts disposed over a film in acoustical coupling with a substrate which is vibrated by a transducer.

FIG. 1a illustrates a modification of the FIG. 1 device resulting from replacing the interdigital contacts by a pair of single strip contacts.

FIG. 2 illustrates an experimental arrangement for detecting motion in accordance with the invention, and FIG. 3 is a graph illustrating an electrical signal provided by the arrangement shown in FIG. 2.

FIG. 2a is a block diagram illustrating motion stabilization of an image in accordance with the invention.

FIG. 2b is a block diagram illustrating image scaling in accordance with the invention.

FIG. 2c is similar to FIG. 2 and illustrates an experimental arrangement for detecting motion in accordance with the invention.

FIG. 2d illustrates a device for detecting 2-dimensional motion.

FIG. 4 illustrates electrical signals obtained from an invented device for two different image patterns.

FIG. 5 is a block diagram illustrating a pattern recognition system utilizing the invented devices.

FIG. 6 is an illustration of a spatial scanning device.

FIG. 7 illustrates a modification of the FIG. 1 device resulting by replacing the interdigital contacts by plate contacts separated by an isolator film.

FIG. 8 illustrates a modification of the FIG. 1 device resulting from replacing the transducer shown in FIG. 1 with different transducers.

FIGS. 9 and 10 illustrate reconstruction devices.

FIG. 11 illustrates a device for preprocessing an image impinging on a DEFT device, whereby a two-dimensional Fourier transform representation of an image can be obtained by using only one-dimensional strain waves.

FIG. 11a is similar to FIG. 11, but uses a photocell to obtain the magnitude only of a Fourier transform representation of an image.

FIG. 12 illustrates preprocessing an image by the use of a spatial sampling mask.

FIG. 12a illustrates one example of a spatial sampling mask.

FIG. 13 illustrates an alternate reconstruction device.

DETAILED DESCRIPTION

A DEFT device illustrating the image and strain wave interaction which the invention reflects is illustrated in FIG. 1 and comprises: a substrate 20 of a material capable of undergoing strain disturbances, such as lime glass; a film 22 which is disposed over a surface of the substrate 20 in acoustical coupling with it and comprises a material having an electrical property that varies as a function of an image incident on it and as a function of strain disturbances in it, e.g., a thin cadmium sulfide film; interdigital contacts 24a and 24b which are of an electrically conductive material such as indium and have interleaved fingers in electrical contact with the film 22, with each finger of one contact spaced from the adjacent fingers of the other contact by narrow strips of exposed film 22; and a transducer 26 of a material such as lead zirconate-lead titanate (PZT) ceramics acoustically coupled with the substrate 20 through a wedge 28 of a material such as a Plexiglas (Lucite) and driven at selected frequencies by a transducer frequency generator 30 to induce surface acoustic waves (Rayleigh waves) that propagate along the surface of the substrate carrying the film 22 and are substantially absorbed by the acoustic absorbing tape 32 wrapped around the opposite end of the substrate 20. A constant bias potential $V_o$ is established across the contacts 24a and 25b by a bias supply 34, and the A.C. conductivity between film strips separating the fingers of the contracts 24a and 24b is measured across a resistor 36 by an amplifier 38 whose output 38a goes to a phase-synchronous phase detector 40 measuring the phase displacement with respect to the output of the transducer frequency generator 30 and to a phase-synchronous amplitude detector 42 measuring the amplitude of the A.C. conductivity component which is at the frequency of the generator 30. In one technique of making the device shown in FIG. 1, the cadmium sulfide film 22 is vacuum deposited on the lime glass substrate 20 and is then cured in a furnace to increase its light-to-dark conductance ratio. The interdigital contacts 24a and 24b are deposited over the film 22 by a photomasking or a mask evaporation process.

When an image from the source 44 is incident on the film 22 and the transducer 26 sends a surface wave propagating along the top surface of the substrate 20, the conductivity of the film 22 between the contacts 24a and 24b is modulated both by the image and by the surface wave. The bias supply 34 maintains the voltage $V_o$ between the contacts 24a and 24b constant, so it is the current between the contacts 24a and 24b that is modulated by the interaction of the image and the surface wave. This current is measured by measuring the voltage across the resistor 36. The output of the amplifier 38 thus corresponds to the A.C. component of the modulated conductivity of the film 22. The phase of this A.C. component with respect to the surface wave (e.g., with respect to the output of the generator 30) is detected and recorded at the phase detector 40, and the amplitude is detected and recorded at the detector 42. Together, the phase and amplitude information from the detectors 40 and 42 at a given surface wave frequency are representative of the Fourier series term for that frequency that defines the intensity variation of the entire image incident on the exposed film strips between the interdigital fingers of the contacts 24a and 24b.

Referring to FIG. 1a, consider first the simpler case of a device which is identical to that shown in FIGS. 1, except that it has only two contacts 24c and 24d exposing a single strip of CdS film instead of the N-finger contacts of FIG. 1. Note that this corresponds to the FIG. 5 device in the first filed parent application of which this case is a CIP. In the device of FIG. 1a, the strain wave $\Sigma(x, t)$ propagating along the top surface of the substrate 20 can be described by the expression $\Sigma(x,t) = \Sigma_o \exp j(wt-kx)$ when a sinusoidal voltage is applied to the terminals of the transducer 26, where $\Sigma_o$ is a constant, $w$ is the angular frequency of the output of the generator 30, $t$ is time, and $k$ is the wave number ($k = w/c$, where $c$ is the propagation velocity of the wave in the substrate 20). The frequency of the generator 30 determines the wavelength of the surface strain wave propagating along the top of the substrate 20. When a constant voltage $V_o$ is applied across the contacts 24c and 24d from the bias supply 34, and an image whose intensity pattern in the x-direction is $I(x)$ is projected onto the film 22 from the image source 44, the conductivity of the film 22 varies as a function both of the image intensity distribution $I(x)$ and the surface strain wave $\Sigma(x,t)$. The generalized conductance, $g(x)$, per unit length of an exposed film strip between the contacts 24c and 24d can be expressed as $$g(x) = [\sigma_D + \sigma_L I(x) + \sigma_{DS}(x)\Sigma(x,t) + \sigma_{LS} I(x)\Sigma(x,t)]/h \quad \text{(e-1)}$$

where $h$ is the width of the exposed film strip, $\sigma_D$ is the dark conductance of the film per square, $\sigma_L$ is the change of the conductance of the film per square with image intensity flux $I(x)$, $\sigma_{DS}$ is the change of the dark conductance of the film per square with strain $\Sigma(x,t)$ and image intensity flux $I(x)$, and $\sigma_{LS}$ is the change of the conductance of the film per square with image intensity flux $I(x)$ and strain $\Sigma(x,t)$.

Carrier diffusion may be neglected because the diffusion length is of the order of the film thickness, which is thin compared with the acoustic wavelength. The total current between the contacts 24c and 24d is then $$i = V_o \int_0^a g(x)dx$$

where $a$ is the length of the film strip and $V_o$ is the constant voltage from the bias supply 34. For a film which has a high ratio of light conductance to dark conductance, $\sigma_D$ and $\sigma_{DS}$ are small compared with $\sigma_L$ and $\sigma_{LS}$ respectively. The only important time-varying component (the AC component) of the current $i(t)$ is then $$i(t) \approx (V_o\sigma_{LS}\Sigma_o/h) \exp(jwt) \int_b^a I(x)\exp(-jkx)dx. \quad \text{(e-2)}$$

The expression immediately above shows that the A.C. component $i(t)$ of the current between the contacts 24c and 24d corresponds to the Fourier transform of the image intensity pattern $I(x)$ (with $I(x)$ being zero outside the confines of the film 22 between the two contacts). Each Fourier component corresponds to a single spatial frequency $k$.

For the N-finger interdigital contacts 24a and 24b shown in FIG. 1, the time-varying current $i(t)$ through the resistor 36, for the N fingers, can be expressed as $$i(t) = (V_o\Sigma_o\sigma_{LS}/h)\exp(jwt) \sum_{n=1}^{N} \int_0^A \exp(-j\vec{k}\cdot\vec{r}_n)I(x,y_n)dx \quad \text{(e-3)}$$

where $A$ is the length of the film strip between two adjacent fingers, $\vec{k}$ is the wave vector, $\vec{r}_n$ is an image point, and $I(x,y_n)$ is the average image intensity over the $n$-th finger. As the fingers become more numerous and thinner, the time-varying current $i(t)$ becomes more closely proportional to the two-dimensional Fourier transform of the intensity of the image incident on the film, and — as the limit is approached — $i(t)$ can be expressed as $$i(t) = (V_o\Sigma_o\sigma_{LS}/(hH))\exp(jwt) \int_0^H dy \int_0^A dx I(x,y)\exp(-j\vec{k}\cdot\vec{r}) \quad \text{(e-4)}$$

where $H$ is the y-dimension (width) of the area covered with the trips of film flanked by fingers.

For a device of the type shown in FIG. 1, either the spacing between adjacent fingers (and the y-width of the fingers) or the shortest acoustic wavelength, whichever is greater, determine the y-direction resolution length. Different components of the Fourier transform are obtained by varying the wavelength of the strain wave. By sweeping the frequency of the generator 30 through a selected frequency range, a series of time-sequential Fourier components of the image projected on the film 22 are obtained at the terminals of the single pair of contacts 24a and 24b. When the detectors 40 and 42 include suitable recorders, the recorded signals are an electrical representation of the 2D image from the source 42.

Again considering the device of FIG. 1a, assume that the transducer frequency generator 30 excites the transducer 26 with a voltage $e(t)$ which has a temporal Fourier transform $E(w)$. The resulting strain in the substrate 20, $\Sigma(x,t)$ has a temporal Fourier transform $\Gamma(x,w)$ which can be expressed as $$\Gamma(x,w) = E(w)S(x,w), \quad \text{(e-5)}$$

where $$S(x,w) = S(o,w) \exp(-jk(w)x), \quad \text{(e-6)}$$

and where $S(o,w)$, represents the frequency response of the combination of the transducer 26, the wedge 28 and the substrate 20. Thus, the voltage $v(t)$ across the resistor 36 has a temporal Fourier transform $V(w)$ given by $$V(w) = B \int E(w) S(x,w) I(x) dx \qquad (e\text{-}7)$$

where B contains the appropriate coupling constants and $I(x)$ is the intensity of the image from the source 44. Combining equations (e-6) and (e-7), and assuming that the acoustical dispersion relation $k(w)$ is kown, the result is $$v(t) = \frac{B}{2\pi} \int_{-\infty}^{\infty} S(o,w) E(w) I(k(w)) \exp(jwt) dw. \qquad (e\text{-}8)$$

where $I(k)$ is the spatial Fourier transform of $I(x)$.

The above expression indicates that given $k(w)$ and $S(o,w)$, which are characteristic for a specific device, one can select the output voltage $e(t)$ of the transducer frequency generator 30 to have a temporal Fourier transform $E(w)$ which produces a voltage across the resistor 36 giving different types of information about the image. To do this, however, the exact characteristics of the individual device must be known, i.e., one must know the quantities $S(o,w)$, $k(w)$ and B.

There are certain uses in which, in accordance with the invention, valuable information about the image incident on the invented devices can be extracted without knowing the device-dependent characteristics. Examples of such uses are in the field of: motion detection; translation, magnification and zoom; and pattern recognition.

In motion detection in accordance with the invention, the invented devices can detect not only parameters which are conventionally detected by other systems, such as the presence of motion and the instantaneous distance between the moving object and the observer (and hence the radial velocity of the moving object), but also the velocity of the moving object in a plane transverse to the viewing axis. Motion detection in accordance with the invention makes use of the invented devices and of the spatial shifting theorem of Fourier transforms:

$$I(x + x_o) \rightleftharpoons I(k) \exp (jkx_o). \qquad (e\text{-}9)$$

For an understanding of the principles involved in motion detection in accordance with the invention, suppose we are observing an image $I(x)$ composed of a stationary part $f(x)$ and a moving part $m(x)$ which does not leave the viewing region. In the typical case there will be interference; that is the moving object will cancel (mask) a part of the stationary part of the image, and the stationary part of the image will actually change because of the motion within the image. However, if very high acoustic frequencies are used, this effect of interference or masking can be substantially eliminated. In effect, we will be observing only the edge components of the image and there will be no masking. It is then possible, in accordance with the invention, to detect velocity at a single acoustic frequency.

Suppose an image has an intensity, $I(x)$, which is $$I(x) = f(x) = m(x - x_1) \qquad (e\text{-}10)$$

where $x_1 = x_1(t)$, assuming no masking. Then $$I(k) = F(k) + M(k) \exp.(-jkx_1). \qquad (e\text{-}11)$$

where $F(k)$ and $M(k)$ are the spatial Fourier transforms of $f(x)$ and $(x-x_1)$ respectively.

In accordance with the invention:

$$\dot{x}_1(t) = -1/k \, d/dt \, \arg \, d/dt \, I(k). \qquad (e\text{-}12)$$

where the above expression gives the velocity $\dot{x}_1(t)$ of the moving object with respect to the fixed part of the image in the $x$ direction, which is transverse to the viewing axis. The velocity is a function of the phase and magnitude of the FT representation of the image.

This aspect of the invention is illustrated in FIGS. 2 and 3, where FIG. 2 shows an experimental arrangement for detecting motion in a plane transverse to the viewing axis and FIG. 3 shows the phase of a single frequency component vs. time as a single object moves in a plane transverse to the viewing axis. In FIG. 2, a screen 48 is mounted on a lead screw 52 and moves at a constant velocity in the indicated direction as the lead screw 52 is rotated by a motor 54. The screen 48 is dark, except for a light spot 48a, and the light spot 48a is always within the field 48b of a camera 58 as the screen 48 moves. The only change within the field 48b is thus the position of the light spot 48a with the camera 58. The camera 58 encloses all of the elements of the FIG. 1a device, except the frequency generator 30 and the detectors 40 and 42, and has a lens 56 for focusing the screen onto the film of the enclosed device. The lens 56 is a conventional focusable lens, e.g., a commercial 55 mm lens, and the substrate 20 is in the camera 58 in a plane parallel to that of the screen 48. The camera 58 is connected to a frequency generator 30 for driving the transducer 26 in it and to a phase detector 40 for detecting and recording the output of the internal amplifier 38, and encloses a suitable shield for electrostatically shielding the contacts 24a and 24b from the signal which drives the transducer 26.

As the screen 48 moves steadily along the lead screw 52, the phase of the detected electrical signal varies with respect to time as illustrated in FIG. 3, where the phase cycles through $2\pi$ radiants per wavelength of spatial shift, as measured by the detector 40. The output of the detector 40 is fed to an analog calculator 46, which calculates the velocity, $v$, of the screen 48 with respect to the stationary camera 58 by obtaining the product f.a $= v$, where f is the frequency at which the frequency generator 30 drives the transducer 26 and $a$ is the movement of the screen 48 with respect to the camera 58 necessary for a 360° phase shift between the signal from the frequency generator 30 and the signal received by the phase detector 40 from the contacts 24c and 24d. Note that a may be in units of time, since uniform motion of the screen 48 is assumed. In one experimental arrangement, the relative phase between the signals received by the phase detector 40 was measured with a Hewlett-Packard 8905 network analyzer, to get a plot similar to the one shown in FIG. 3. An indicator 50 shows the calculated value of velocity.

For detecting two-dimensional motion in accordance with the invention, expression (e-12) becomes:

$$k_x \dot{x}_1(t) + k_y \dot{y}_1(t) = -d/dt \, \arg \, d/dt \, (\eta(\vec{k})) \qquad (e\text{-}12a)$$

where the wavevector $\vec{k} = \hat{k}_x x + \hat{k}_y y$.

Referring to the arrangement shown in FIG. 2, suppose the lead screw 52 is not along the x-axis or the y-axis, and that the DEFT device is of the type shown in FIG. 2d where an x-transducer and a y-transducer are driven by suitable sources to provide alternating $x$ and $y$ strain waves. The motion component in the x-direction is detected by the DEFT device when only the x-direction transducer is excited to provide an x-direction strain wave, and motion in the y-direction is detected by the DEFT device when only the y-direction transducer is excited to provide a y-direction strain wave.

The DEFT device in FIG. 2d can be of the type shown in FIG. 1a, and has two leads connected to a measuring network of the type shown in FIG. 2. The velocity component in any direction can be found by propagating a strain wave in that direction.

A somewhat more complex situation is illustrated in FIG. 2c, which differs from FIG. 2 in that the screen 48 is stationary with respect to the camera 58, but the lead screw 52 moves a bar 51 in front of and across the screen 48. An image projector 45 projects an image over the screen 48 and over the bar 51, and this image is modified as the bar 51 moves. When both the frequency and the magnitude of the signal from the camera 58 are detected at detectors 40 and 42 respectively, an analog calculator 46 solves expression (e-12), with both phase and magnitude of the signal from the camera 58 taken into consideration, and indicator 50 shows the velocity of the bar 51 with respect to the screen 48 and to the camera 58. The same considerations apply to the two-dimensional situation where equation (e-12a) has to be solved for both phase and magnitude in each of the two dimensions.

The more difficult case is when two objects are moving within an image, with two different velocities. In this case the spatial Fourier transform of the image $I(k)$ can be expressed as $$I(k) = F(k) + M_1(k) \exp.(-jkx_1) + M_2(k) \exp.(-jkx_2). \quad \text{(e-13)}$$

where $F(k)$ is the spatial Fourier transform of the stationary part of the image and the second and third term on the right-hand side of equation (e-13) are the spatial Fourier transform of the first and second moving objects respectively. Differentiating equation (e-13) gives $$\dot{I}(k) = -jk\dot{x}_1 M_1(k) \exp.(-jkx_1) - jk\dot{x}_2 M_2(k) \exp.(-jkx_2). \quad \text{(e-14)}$$

Clearly, the velocities of the two different moving objects are now entwined in the expression given immediately above.

Consider the two moving objects in the image $$M(k) = |M_1| \exp.(-jkx_1 = \phi_1) + |M_2| \exp.(-jkx_2 + \phi_2) + \ldots \quad \text{(e-15)}$$

where the phase shifts contain all the time variations, as in the case of a single object discussed above.

The motion of each of the moving objects in the image can be approximated by a truncated power series $$x_1 = a_1 t^2 + b_1 t + c_1. \quad \text{(e-16)}$$

For constant velocity motion of the moving objects in the image, each term on the righthand side of equation (e-20) is in the form $$\exp.(-jkb_1 t) = \exp.(-jw_1 t). \quad \text{(e-17)}$$

When an electrical signal representing such constant velocity motion is applied to a spectrum analyzer, the spectrum analyzer responds to it at frequency $w_1$. Then, knowing $k$, the velocity $b_1$ can be found by an analog calculator solving equation (e-17) for $b_1$. By scanning the spectrum analyzer in $w$, all velocities present can be determined in similar manner.

A dispersive delay line can be used instead of a spectrum analyzer, bacause the signal applied to it and corresponding to different objects moving at different velocities in the image travel in the dispersive delay line at different velocities and can thus be detected at different times. Knowing the delay as a function of frequency makes it possible to identify the velocities.

The principles described above in connection with motion detection can be used in accordance with the invention for electronic image stabilization. Referring to equation (e-9), it is noted that if the whole image viewed by the camera 56 is displaced by $x_o$ with respect to the camera, a single phase mesurement at $w = w(k)$ yields the value of $kx_o$, and thus the displacement $x_o$. Since the detected phase value is proportional to the displacement of the entire image with respect to the camera, the signal representing the phase value can be put to uses such as adjusting the camera aim so that the camera retains the same orientation with respect to the image, or recentering the image by substracting a signal representing $kx_o$ from the phase of all Fourier components of an electrical signal representing an image in accordance with this invention before reconstructing the image from these electrical signals.

Still in accordance with the invention, and based on the above discussion of motion detection, use can be made of the scaling expression $$I(ax) \rightleftharpoons 1/|a| \; I(k/a) \quad \text{(e-18)}$$

to produce an electronic zoom effect by either magnifying or reducing the image as represented by electrical signals in accordance with the invention. Using a value for $a$ of less than 1 expands the image, and using a value for $a$ greater than 1 reduces the image size.

Examples of the two uses of the invention discussed immediately above are illustrated in FIGS. 2a and 2b where the DEFT devices 58 and 60 may be either of the devices shown in FIGS. 1 and 1a, or any of the other devices exhibiting the invented effect of converting a light image to a Fourier transform representation thereof.

Referring to FIG. 2a, a DEFT device 58 receives an image from a source 44 and is vibrated by a frequency generator 30, in the same manner as the device shown in FIG. 1. A calculator 62, which an analog circuit implementation of equation (e-9), receives the output of the DEFT device 50a (the output of the amplifier 38 over a line 38a and the output of the frequency generator 30), and provides an output representing the calculated value of the quantity $kx_o$. This quantity is added, algebraically, to the phase of the Fourier transform term for which it was derived at an adder 64. Note that the output of the DEFT device 58 is delayed at the delay 66 by a time interval sufficient to make sure that the two inputs of the adder 64 correspond to the same Fourier transform term. The output of the adder 64 is a motion stabilized representation of the image from the source 44.

Referring to FIG. 2b, the output of a DEFT device 60 is applied to a magnitude scaler 68a whose other input is from a source 70 for a selected value of $a$ and to a phase scaler 68b whose other input is from a source for the inverse of *a*. The respective outputs of the scalers 68a and 68b are the magnitude and phase components respectively of a scaled Fourier transform representation of the image from the source 44, and it can be either a magnified image representation or a reduced representation depending on the selected value of the constant from the sources 70a and 70b.

Pattern recognition is another use of the invented devices which, like motion detection, is not device dependent, because a given device generates the same response for the same pattern, regardless of the specific coupling between the transducer 26, the wedge 28 and the substrate 20 and regardless of the unique characteristics of the substrate 20.

FIG. 4 is an illustration of the electrical signal at the output of the amplifier 38 in the FIG. 1a device when the image source 44 projects on the film 22 two different patterns whose total light intensity is the same. The curves shown in FIG. 4 are produced when the transducer frequency generator 30 scans through a frequency range from 0.1 to 5 MHz. The upper curve in FIG. 4 results when the image source 44 projects uniform light through two slits which are spaced in the x-dimension and whose shape and dimensions are shown in the upper right corner in FIG. 4, and the lower curve is produced when the image source 44 projects uniform light, of the same overall intensity, through two slits whose shape and dimensions are shown in the lower right corner of FIG. 4. As seen in FIG. 4, when the overall image light intensity is the same, but the slits through which uniform light is projected are differently shaped or are differently spaced, the resulting output of the amplifier 38 is markedly different. Conversely, when the image source 44 projects images whose overall light intensity differs, but whose light intensity distribution is the same, the resulting output of the amplifier 38 may differ in amplitude, but not in the location of nulls and peaks.

This property of the invented device is useful in a pattern recognition system, a simple example of which is illustrated in FIG. 5, where the image source 44 projects an image onto the active area of a DEFT device 72 which may be either of the devices shown in FIGS. 1 and 1a, or any other DEFT device. The output of the DEFT device 72, as its frequency generator 30 scans through a selected frequency range, is an electrical signal of the type shown in FIG. 4, and it is applied to a comparator 74 whose other input comes from a storage device 76 that may be a magnetic tape storage device storing previously obtained electrical signals of the type shown in FIG. 4. The comparator 74 provides an output to a display device 78 which indicates if the two inputs to the comparator 74 are identical or not, i.e., if the image projected from the source 44 onto the DEFT device 72 is the same as the image whose Fourier transform representation is being provided to the comparator 74 from the storage device 76. Relatively simple images, such as the alphabet letters and the numerals can be uniquely represented by the Fourier transform components corresponding to only a few frequencies. Hence, the transducer frequency generator 30 may be made to generate only a few different frequencies when the image projected from the source 44 onto the DEFT device 72 is relatively simple, and the storage device 76 needs to store the Fourier components corresponding to only these few frequencies. By a suitable prior art mechanical drive, a one-dimensional DEFT device 58 of the type shown in FIG. 1 may be made to scan an image such as a letter, to generate an output signal corresponding to several line sections of the image. Alternately, an image may be projected simultaneously over a number of closely adjacent devices of the type shown in FIG. 1a, to generate a composite output corresponding to the spatial Fourier transform of a number of line sections of the image.

In the above description, the outputs of the discussed DEFT devices have been Fourier transform representations of the incident images. However, the same type DEFT devices can be excited by a different surface wave to produce an output which at any instant of time is proportional to the intensity of a single point of the image. Referring back to equation (e-9), assume that the excitation voltage $e(t)$ is a very narrow pulse $\delta(t)$ in which case the temporal Fourier transform of the exciting voltage $e(t)$ is $E(w) = 1$. If the transducer-wedge substrate frequency response $\Sigma(o,w)$ is approximated as a set of unit delta functions equispaced in frequency at $w_n$, the output voltage of the DEFT device can be expressed as $$v(t) = A \sum_{n=-\infty}^{\infty} p(k(w_n)) \exp(jw_n t) \qquad (e\text{-}19)$$

which reduces to $$v(t) = 2\pi A\, I(wt/k). \qquad (e\text{-}20)$$

Thus, the output of a DEFT device excited with a very narrow pulse is a voltage which is proportional not to the Fourier components of the image intensity but to the image intensity itself. For a one-dimensional DEFT device of the type shown in FIG. 1a, the output voltage at any time instance is proportional to only a single point of the image along the x-direction. Thus, a DEFT device can be used as a spatial scanning camera.

Referring to FIG. 6 for a simple example of the use of a DEFT device as a spatial scanning camera, a substrate 78, such as fused quartz is divided into a number of horizontal strips by a number of score lines 78a into its top surface. Each of the strips has on its top surface a film strip 80 and a pair of contacts 82 and 84 which are of the type shown in FIG. 1a. An interdigital transducer 86 is affixed to the left side of the surface of each strip and is driven by a delta function generator 88 which provides a very narrow excitation pulse for driving the transducer 86 when activated by a sequential scanner 90. The contacts 82 and 84 of each strip are connected to a corresponding voltage detector 92. The outputs of the voltage detectors 92 are scanned sequentially by another scanner 94 whose output is fed to a device 96 which may be, for example, a magnetic tape storage device or a transmitter.

In operation of the device in FIG. 6, when the scanner 90 selects the top delta function generator 88, the transducer 86 of the top strip generates a very narrow sound pulse which propagates along the length of the film strip 80 as a surface wave. At this time no other delta function generator is enabled, and the sound pulse from the transducer 86 of the top strip can not propagate to the other strips because it is in the form of a surface wave and the score lines 78a are deeper into the substrate 78 than the depth of that surface wave. An acoustical absorber (not shown) may be used at the righthand side of the substrate. As discussed above in connection with equations (e-24) and (e-25), when an image is projected onto the substrate 78, the voltage detected by the detector 92 of the top strip at any instant of time is proportional to the image intensity at the point of the film strip 80 coinciding with the instantaneous location of the narrow sound pulse. Thus, during the time interval of propagation of the sound pulse along the film strip 80 between the contacts 82 and 84, the detector 92 receives a voltage which varies with time as the image intensity along the film strip 80 between the contacts 82 and 84. The scanner 90 excites each of the delta pulse generators 88 in a sequence allowing the sound pulse to propagate along each of the film strips 80 in sequence. The scanner 94 is synchronized with the scanner 90, and the device 96 receives a voltage signal which corresponds to the image intensity line scan of the image projected on the substrate 78, i.e., a signal similar to that generated by a television camera.

A new type of a DEFT device, relying on photo-assisted tunneling current, is illustrated in FIG. 7, and differs from the FIG. 1 device only in that the interdigital contacts 24a and 24b of the FIG. 1 device are replaced in the FIG. 7 device by plate contacts 24e and 24f separated from each other by an oxide film 24g. Each of the films 24e, 24f and 24g is very thin and is in acoustical contact with the substrate 20. The thickness of the oxide film 24g is of the order of hundreds of Angstroms. The top aluminum film 24f is semitransparent, so that an image incident on it can reach its interface with the aluminum oxide 24g. The DEFT device of FIG. 7 uses the change in the photon assisted tunnelling current between the aluminum films 24e and 24f to obtain, at the output of the amplifier 38, an electrical signal representing a spatial Fourier transform of the image incident on the top film 24f. The interaction of the image and the strain waves induces tunnelling across the oxide film 24g which is a function of image intensity distribution. As one possible explanation of the effect, the total collected tunnelling current between the contacts 24e and 24f is proportional to the integral of the current density over the area of the interface with the oxide film 24g. Since the number of photon assisted electrons which tunnel thrugh this interface is proportional to the impinging photon flux on the interface, the AC component of the photocurrent $i$ between the contacts 24e and 24f, which is proportional to the Fourier transform of the 2-dimensional image, may be expressed as $$i \propto i_o \Sigma_o \int_0^H dy \int_0^a dx\, I(x,y)\exp j(\vec{k} \cdot \vec{r}) \quad \text{(e-26)}$$

where the integration is over the area where the contacts 24e and 24f and the oxide film 24g overlap ($a$ in the x-direction and H in the y-direction, and $\Sigma_o$ is a constant for the strain which propagates along the substrate 20 as a surface wave. The advantage of the device shown in FIG. 7 is that no interdigitation limits its resolution, as with the device in FIG. 1, so that resolution is limited only by the acoustic wavelength.

In order to eliminate difficulties which may result from the shunt capacity of the device of FIG. 2, the common area (the area where the contacts 24e and 24f and the oxide film 24g overlap) may be made long in the x-direction and very short in the y-direction, to thereby make the device shown in FIG. 7 essentially a one-dimensional device, detecting image intensity variation in the x-direction only. For example, the top aluminum contact 24f may be a very thin strip of aluminum extending in the x-direction.

An example of a two-dimensional DEFT device combining the principles of this invention with a known physical effect called the Franz-Keldysh effect is illustrated in FIG. 8, in which the device of FIG. 1 has been modified by making the substrate 20 square and by replacing the frequency generator 30, the transducer 26 and the wedge 28 by three interdigital transducers 100, 102 and 104 driven by the respective sweep frequency generators 100a, 102a and 104a. The contacts 24a and 24b are disposed approximately at the center, and the transducers 100, 102 and 104 ring the contacts 24a and 24b and provide strain waves along three non-congruent directions. The AC component of the current through the resistor 36 can be expressed as $$i_{n,m} = (V_o \sigma_{LS} \Sigma_{o,n} \Sigma_{o,m}/2hH)\exp j(w_n \pm w_m)t \int_0^a dx. \quad \text{(e-27)}$$

$$\int_c^H dy\, I(x,y)\exp j(k_n x \pm k_m y)$$

$n, m = 1, 2, 3$ where the notation is the same as in equations (e-1) and (e-2), and the subscripts $n$ and $m$ identify the three transducers 100, 102 and 104. The current $i_{n,m}$ is proportional to a two-dimensional Fourier transform representation of the intensity distribution of the image projected onto the contacts 24a and 24b and to the square of the strain in the device. Thus, it is possible with the device shown in FIG. 8 to obtain the two-dimensional spatial Fourier transform representation of an image. without a two-dimensional acoustic wave pattern. The frequencies at which the sweep frequency generators 100a, 102a and 104a operate have to be sufficiently high so that the product, $w_n \tau$, of the frequency $w_n$ and the relaxation time $\tau$ (which for cadmium sulfide is approximately 0.87 nanoseconds) is greater than 1. Note that the photocurrent components would be detected at specific frequencies $w_n + w_m$, rather than at a continuously swept frequency.

For many uses of the invented DEFT devices, reconstruction of the image by converting a Fourier transform representation back into the original image is not required. If reconstruction is required, it can be done by either (1) computing the inverse Fourier transform and displaying it on a conventional CRT device, or (2) using the output of a DEFT device to drive a novel reconstruction device in accordance with the invention. For reconstruction in accordance with the invention, uniform light, which need not be coherent, is modulated by a medium undergoing strain disturbances corresponding to the Fourier transform representation of the desired image.

Considering first the reconstruction of a one-dimensional image $f(z)$ which varies only in the z-direction, the mathematical relationship is $$f(z) = \frac{1}{2\pi} \int_{-\infty}^{+\infty} \exp(jkz) F(k)\, dk \quad \text{(e-28)}$$

where $F(k)$ is the Fourier transform of $f(z)$. Since the function $f(z)$, which represents the light intensity variation as a function of position, is real and can be chosen to exist only for positive values of $z$, the above expression 28 can be written as either of expressions (e-29) or (e-30) below $$f(z) = \frac{2}{\pi} \int_0^\infty R(k) \cos kz \, dk \quad \text{(e-29)}$$

or $$f(z) = -\frac{2}{\pi} \int_0^\infty X(k) \sin kz \, dk \quad \text{(e-30)}$$

where R(k) and x(k) are the real and imaginary part respectively of the Fourier transform F(k). Referring back to FIG. 1, the real part R(k) is the input to the amplitude detector 42 and the imaginary part X(k) is the input to the phase detector 40. Either can be used to reconstruct a one-dimensional image.

Choosing X(k), note that the input of the phase detector 40 is a series of signal components, each for a given frequency of the strain wave through the substrate 20 and each including the term X(w) sin wt. In order to reconstruct the image from which these signal components are generated, first the time variations associated with each frequency component has to be converted to a spatial variation of the form X(k) sin kz. Next the spatial variations for the different frequency components have to be added with proper phases to get a composite spatial variation and to modulate uniform light with this spatial variation.

Considering the simplest case of reconstructing a one-dimensional image represented by a single Fourier transform signal F(k), refer to FIG. 9 which shows collimated uniform light (either coherent or non-coherent) coming from a suitable source and passing first through a polarizer 110 then through a fused quartz plate 112 coupled with a transducer 114 excited by a source 116, and then through an analyzer plate 118 before impinging on a viewing screen 120. Assume that light rays remain parallel to each other inside the plate 112 (assuming a process within the Raman-Nath region), that the source 116 drives the transducer 114 with a sinosoidal wave at a resonant frequency to generate standing waves in the plate 112, and that the polarizer and analyzer 110 and 118 are crossed to give zero light on the screen when no electrical signal is applied to the transducer 114. The fused quartz plate 112 becomes birefringent when a strain wave propagates in it. Each ray of light splits into two orthogonally polarized rays which travel inside the plate 112 with different phase velocities. The angular separation between them is of the order of the wavelength of light and is hence neglected. If the phase difference between the two rays after they exit the plate 112 is δ, then the intensity of light I on the screen 120 can be expressed as $$I = I_o \sin^2 \delta/2 \quad \text{(e-31)}$$

where $I_o$ is the light intensity in the absence of any strain in the plate 112 when the polarizer and analyzer 110 and 118 are not crossed but are parallel to each other.

Assuming that: the material of the fused quartz plate 112 is isotropic and is a cubic crystal, that the length L of the plate 112 in the z-direction is an integral multiple of τ/2, where τ is the vacuum wavelength of light, the strain is 0 at the two z-direction ends of the plate 112; the intensity I on the viewing screen 120 can be expressed as $$I = I_o [\sin(\tfrac{1}{2}\delta_o \sin 2\pi z/\lambda_s \sin w_s t)]^2. \quad \text{(e-32)}$$

where $\delta_o = \pi d \, n^3 A \Sigma_o/\lambda$, d is the distance the light ray travels in the plate 112, n is the refractive index of the plate 112, A is a constant depending on the elasto-optical constants of the material of the plate 112. $\Sigma_o$ is a constant for the amplitude of the wave propagating in the material 112, $\tau_s$ is the wavelength of the strain wave in the plate 112 and $w_s$ is the frequency of that strain wave.

The time average value of the normalized intensity $I/I_o$ can be expressed as $$<I/I_o> = \delta_o^2(1/16 - 3/1024) - \delta_o^2(1/16 - 1/256) \cos 4\pi z/\lambda_s. \quad \text{(e-33)}$$

for the cases where the term $\delta_o$ is made equal to or less than 1. The above expression (e-33) indicates that the light intensity on the viewing screen 120 varies sinusoidally in the z-direction but with a frequency twice that applied to the transducer 114, and as the square of the amplitude of the electrical signal, rather than with the electrical signal itself. In order to reconstruct on the screen 120 the exact image which corresponds to a given Fourier transform representation thereof, the frequency component of the signal can be divided by 2 and the square root of its amplitude can be taken prior to driving the transducer 114 at the corresponding frequency. For example, referring to FIG. 9, the electrical signal representing the Fourier transform component of a one-dimensional image at a single frequency can be stored in a storage device 122 and the output of the storage device 122 can be squared and divided by 2 in frequency at a circuit 124, whose output controls the output of the source 116 driving the transducer 114.

The above discussion refers to the case where a one-dimensional Fourier transform representation of an image is obtained by vibrating a DEFT device at a single frequency. In the more general case, a one-dimensional FT representation is obtained by vibrating the DEFT device at a succession of different frequencies, to thereby obtain a succession of Fourier transform components. Assuming that the Fourier transform F(k) has been sampled at discrete frequencies which are evenly spaced, the expression (e-30) reduces to $$f(z) = -\frac{2}{\pi} \sum_{n=1}^{\infty} X(k_n) \sin k_n z \quad \text{(e-34)}$$

where $k_n = n \, w_o/v_s$, $v_s$ being the velocity of sound in the substrate 20.

An image of this type can be reconstructed by the system shown in FIG. 10 where a light source 126 directs a uniform beam of light, which need not e coherent light, through a collimating lens 138 and through a combination of a polarizer 110, a fused quartz plate 112 and an analyzer 118 which are the same as in FIG. 9. The plate 112 is driven by a transducer 114 and the light beam emerging from the analyzer 118 impinges on a screen 120, as in FIG. 9.

The output of a DEFT device 130, which may be of the type shown in FIG. 1a and which is driven at a succession of evenly spaced frequencies of vibration to produce an electrical signal of the same duration for each frequency of vibration, is connected to a phase synchronous detector 132 similar to the phase detector 40 in FIG. 1. The output of the phase detector 132 is a succession of electrical signals each representing in amplitude the quantity $X(k_n)$.

Before being applied to the quartz plate 112, the output of the phase synchronous detector 132 has to be modified in several ways. Its square root has to be taken, as discussed in connection with FIG. 9, and further a compensation must be made for the fact that the substrate of the DEFT device 130 is not strained equally by all the frequencies at which it is vibrated. To do this the output of the phase synchronous detector 132 is applied to a square root circuit 134, and a number of constants, one for each frequency of vibration of the substrate 20 of the DEFT device 130, are stored in a read only memory (ROM) 136. The constants in the ROM 136 may be experimentally derived by vibrating a particular substrate 20 at the frequencies of interest and calculating a multiplier to equalize the strain amplitudes. The ROM 136 is addressed once for each different frequency of vibration by an address circuit 138 to read out a constant corresponding to the particular Fourier representation term which is being output from the circuit 134, and the outputs of the circuit 134 and the ROM 136 are multiplied at a multiplier 140, whose output is applied to a summing circuit 142. The other input of the summing circuit 142 is the output of a delay circuit 144 whose delay interval is the same as the duration of each of the components $X(k)$ coming from the multiplier 140. The function of the summing circuit 142 and of the delay 144 is to add up the signals from the multiplier 140, each recirculation through the delay line 140 resulting in an output which is the composite of all previous signals $X(k)$ from the multiplier 140. After the last signal $X(k)$ has been output from the multiplier 140, and has been added in the summing circuit 142 to the previously compiled composite signal, the output of the delay 144 is applied to the transducer 114 through an analog gate 146 which is enabled at that time by a signal from the ROM 136 generated after the last constant is read out therefrom and delayed by a suitable time interval at a delay 148 so that the analog gate 146 can be opened at the appropriate time. The strain wave through the quartz plate 112 now correspond to all the Fourier transform components which have been derived by the DEFT device 130 for a particular ID image, and the light beam from the collimator 128 is modulated by the plate 112 to result in an image projected on the screen 120 corresponding to the original image incident on the DEFT device 130.

Returning to DEFT devices, which obtain a Fourier transform representation of an image, the image can be preprocessed in accordance with the invention, to obtain results such as providing a 2-D FT representation by a new method, using a more convenient vibration transducer to get high resolution, and the like.

In the general case, the image is focused on a valve whose influence on the image can be controlled as a function of time, and the image, as processed by the valve, is focused on a DEFT device.

Referring to FIG. 11, a light beam 150, which may be either coherent or non-coherent uniform light generated at a suitable source, passes through an image slide 152, and the resulting image then passes successively through a first lens 154, a first frequency plane mask 156, a valve 158, a second lens 160 whose focal length $f$ is the same as that of lens 154, a second frequency plane mask 162, and then impinges on a DEFT device 164. The distance between the image slide 152 and the first lens 154, between the first lens 154 and the valve 158, between the valve 158 and the second lens 160, and between the second lens 160 and the DEFT device 164 is the same; it is twice the focal length of lenses 154 and 160.

In one example, the valve 158 is similar to the combination of the polarizers 110 and 118 and the quartz plate 112 in the devices of FIGS. 9 and 10. In the simple case where the strain in the valve 158, as induced from a source 158a, has one-dimensional modes sin $k_y y$, the output of the valve 158 is of the form $I(x,y)$ $(l + \sin k_y y)$, neglecting sampling. That is, there are standing strain waves in the valve 158 along the y direction. This product is focused onto the DEFT device 164 by the second lens 160. The first mask 156 is optional and may provide any suitable desired optical processing, such as Schlieren image enhancement. The second mask 162, which is also optional, may provide further processing of this general type.

When the DEFT device 164 has travelling acoustic modes $\exp(-jk_x x)$, i.e. in a direction perpendicular to that of the strain in the valve 158, and responds to light intensity $I(x,y)$ impinging on it, its output current $i(t)$ is:

$$i(t) \alpha \iint axdy\, I(x,y) \,|1 + \sin k_y y|\exp(-jk_x x) \qquad \text{(e-35)}$$

The above reduces to $$i(t)\alpha\ \eta(k_x,o) + \eta(k_x,k_y) \qquad \text{(e-36)}$$

since $\eta(k_x,o)$ can be determined separately, the two-dimensional Fourier transform $\eta(k_x,k_y)$ can be determined from the output of the DEFT device 164.

When a succession of strain waves of different frequency are induced in each of the valve 158 and the DEFT device 164, the output of the DEFT device 164 at each combination of two strain waves defines the term for these frequencies of the FT representation of the image. Thus, a two-dimensional FT representation of the image can be obtained by the use of two one-dimensional strain waves, in two separate media, the waves being transverse to each other.

Still referring to FIG. 11, the valve 158 may alternately be of a material such as lithium niobate, which has a large change in refractive index with strain. Then, the valve can be excited from a suitable source 158a to control its refractive properties as a desired function of time for preprocessing the image impinging on the DEFT device 164 as desired, again for the purpose of obtaining a two-dimensional FT representation of the image emerging from the slide 152.

Referring to FIG. 11a, if everything is as in FIG. 11, except that the DEFT device 164 is replaced by a photocell 166 and a D.C. on-axis stop 168 is placed in front of the photocell 166, the result is a device which obtains the magnitude of the two-dimensional Fourier transform of the image emerging from the slide 152. D.C. stop 168 deletes the average value of the light beam, and the D.C. current in the photocell 166 is proportional to the intensity of a selected Fourier component of the image from the slide 152. The photocell 166 provides the intensity of the integral of the product of the image from the slide 152 and a selected strain mode of the valve 158.

Another form of preprocessing the image impinging on a DEFT device is the use of masks having a high special sampling rate, so as to translate the Fourier spectrum of the image to higher frequency, enabling a high frequency transducer with obtainable bandwidth to provide all required acoustic frequencies. Referring to FIG. 12, a light beam 170 passes through an image slide 172, and the emerging image passes through a first lens 174, a spatial sampling mask 176 and a second lens 178 before impinging on a DEFT device 180. The lenses 174 and 178 have the same focal length $f$, and the spacing between the enumerated elements is as indicated in FIG. 12. The spatial sampling mask 176 does not impair the resolution of the DEFT device 180, provided its spatial sampling rate is sufficiently high (in accordance with the Shannon-Whittaker sampling theorem). One example of a spatial sampling mask 176 is illustrated in FIG. 12a and comprises an opaque screen with many holes.

Referring to FIGS. 12 and 12a, assume that the image emerging from the image slide 172 is $I(x,y)$ and the intensity transmittance of the mask 176 is $g(x,y)$. Then, the intensity image on the DEFT device 180 is $I(x,y)g(x,y)$, and the output of the DEFT device 180 is the Fourier transform of $I(x,y)g(x,y)$. According to the convolution relationship $$I(x,y)g(x,y) \rightleftharpoons \eta(k_x,k_y) * G(k_x,k_y) \qquad \text{(e-37)}$$

where the asterisk indicates convolution and $G(k_x,k_y)$ is the transform of the mask 176. The effect of the convolution is to reproduce the Fourier transform $\eta(k_x,k_y)$ over and over again in Fourier space. Suitable choice of parameters allows these repetitions to be separated. For a simple example, let the samples be tiny pinholes in the mask 176. Then, $$I(x,y) \text{ comb } (x/a) \text{ comb } (y/a) \Longleftrightarrow \sum_{m=-\infty}^{\infty} \sum_{n=-\infty}^{\infty} \eta(k_x-n/a,k_y-m/a) \qquad \text{(e-38)}$$

Consider the case n/a and m/a correspond to acoustic frequencies of 100 MHz and the bandwidth of $\eta(k_x,k_y)$ is 20 MHz. The D.C. component of $\eta(k_x,k_y)$ is $\eta(o,o)$ and is now available at 100 MHz. The highest resolved components are now at 120 MHz.

Accordingly, the DEFT device 180 need only have a high frequency transducer with center frequency at 100 MHz and 20% bandwidth, and this can be implemented by the use of a single interdigital transducer, without the need for a resonant bulk transducer for low frequencies and a separate interdigital transducer for higher frequencies.

The preprocessing principles discussed in connection with FIGS. 11 and 11a can be applied to a reconstruction device as well. Specifically, referring to FIG. 13, a light beam 182 of collimated light (either coherent or non-coherent) passes through light valve 184 and 186 before impinging on a screen 188. A one-dimensional strain wave varying in the x-direction is induced in light valve 184 by a suitable source 184a, and a one-dimensional strain wave varying in the y-direction is induced in the valve 186 by a suitable source 184b. When the strain waves in the light valves 184 and 186 correspond to the appropriate components of a Fourier transform representation of an image, the light intensity distribution on the screen 188 corresponds to the image defined by these terms. By suitably delaying and combining the strain waves corresponding to a number of Fourier representative components, in the manner discussed in connection with FIG. 10, a high resolution two-dimensional image can be projected on the screen 188 by the arrangement shown in FIG. 13.

We claim:

1. A device for detecting motion within an image comprising:
    a medium having an electrical property which varies as a function of an image incident on the medium and as a function of strain disturbances in the medium;
    means for causing the incidence of an image on the medium;
    means for causing strain disturbances in the medium; and
    means for measuring the electrical property of the medium while said image is incident thereon and while the strain disturbances are present in it to derive an electrical signal which is a Fourier transform representation of the image and means for deriving from said signal an indication of motion within the image.

2. A device as in claim 1 including means for obtaining the speed of the motion within the image as a function of said signal.

3. A device as in claim 1 wherein the strain disturbances in the medium are strain waves propagating through the medium.

4. A device as in claim 3 wherein the frequency of the strain wave in the medium corresponds to a wavelength which is substantially shorter than the size of the incident image and the extent of the motion therein.

5. A device as in claim 4 including a transducer driven by a selected signal for causing said strain wave, wherein said means for deriving an indication of motion includes means for deriving said indication as a function of the phase of the electrical signal with respect to the selected signal driving the transducer.

6. A device as in claim 5 wherein said strain waves through the medium are at a single high frequency.

7. A device comprising:
    a medium having an electrical property which varies as a function of an image incident on the medium and as a function of strain disturbances in the medium;
    means for causing the incidence of an an image on the medium;
    means for causing strain disturbances in the medium;
    means for measuring the electrical property of the medium while said image is incident thereon and while the strain disturbances are present therein to derive a first electrical signal representing the image and a second electrical signal indicating motion of the image; and
    means for modifying said first electrical signal with said second electrical signal to modify the first electrical signal in accordance with the motion of the image represented thereby.

8. A device as in claim 7 wherein said second electrical signal represents motion of the entire image with respect to the medium.

9. A device as in claim 8 wherein the modifying means corrects for relative motion between the image and the medium.

10. A device comprising:
    a medium having an electrical property which varies as a function of an image incident on the medium and as a function of strain disturbances in the medium;
    means for causing an incidence of an image on the medium;
    means for causing strain disturbances in the medium;

means for measuring the electrical property of the medium while said image is incident thereon and while the strain disturbances are present therein to derive an electrical signal representing the image;

means for providing a selected constant; and means for modifying the electrical signal with said selected constant.

11. A device as in claim 10 wherein the electrical signal has a phase and a magnitude component, and wherein the modifying means includes means for multiplying at least one of the components of said electrical signal by said selected constant to scale the image represented by the electrical signal.

12. A device as in claim 10 wherein the modifying means includes means for algebraically adding said selected constant to said electrical signal to thereby translate the image represented by the electrical signal.

13. A device for obtaining an electrical signal representation of an image comprising a substrate of a material capable of undergoing time-varying and space-varying strain disturbances, a first electrically conductive film disposed on a surface of the substrate, a selected electrically isolating film disposed on the first conductive film and a second electrically conductive film disposed on the side of the isolating film facing away from the first conductive film, each of said film being acoustically coupled with the substrate to undergo strain disturbances therewith; means for causing the incidence of an image on the junction between one of said conductive films and the isolating film; means for causing strain disturbances in the substrate and in the films; and means for measuring an electrical property of said junction while said image is incident on it and while said strain disturbances are present in it to thereby derive an electrical signal representing the incident image.

14. A device for electronic processing of images comprising a medium having an electrical property which varies as an image incident on the medium and as a function of strain disturbances in the medium, means for causing the incidence of an image on the medium, means for causing strain disturbances in the medium, means for measuring the electrical property of the medium while said image is incident thereon and while the strain disturbances are present therein to derive an electrical signal representing the image, said electrical signal comprising a plurality of phase and magnitude values representative of Fourier series terms defining the image, and means for selectively modifying the image by selectively operating on said phase and amplitude values with selected operators.

15. A device comprising:

a medium having an electrical property which varies as a function of an image incident on the medium and as a function of the square of strain disturbances in the medium;

means for causing the incidence of an image on the medium;

means for causing strain disturbances in the medium, said means comprising a plurality of transducers in acoustical coupling with the medium and means for exciting the transducers for generating the effect of an acoustic beam scanning the medium; and means for measuring the electrical property of the medium while said image is incident thereon and while said strain disturbances are present therein to derive an electrical signal representing the image.

16. A device comprising:

a first medium having an electrical property which varies as a function of an image incident on the medium and as a function of strain disturbances in the medium;

a second medium having an optical property which varies as a function of strain disturbances in the medium;

means for modulating an original image with the optical property of the second medium and for causing the incidence of the resulting modulated image on the second medium;

first and second means for causing strain disturbances in the first and second medium respectively; and means for measuring the electrical property of the first medium while the modulated image is incident thereon and while the strain disturbances are present therein to derive an electrical signal representing the original image.

17. A device as in claim 16 wherein the strain disturbances in the first and second media are along directions transverse to each other.

18. A device comprising:

a medium having an optical property which varies as a function of strain disturbances in the medium;

means for generating an electrical signal corresponding to the intensity of a light image incident thereon; and means for modulating an image with the optical property of the medium while a selected disturbance is present therein, and for causing the resulting modulated image to impinge on the means for generating said electrical signal.

19. A method of detecting motion within an image comprising the steps of:

providing a medium having an electrical property which varies as a function of an image incident on the medium and as a function of strain disturbances in the medium;

causing the incidence of an image on the medium;

causing strain disturbances in the medium; and measuring the electrical property of the medium while said image is incident thereon and while the strain disturbances are present in it to derive an electrical signal having a parameter indicating motion within the image.

20. A method as in claim 19 including the step of obtaining the speed of the motion within the image as a function of said parameter of the measured signal.

21. A method as in claim 19 wherein the strain disturbances in the medium are strain waves propagating through the medium.

22. A method as in claim 21 wherein the frequency of the strain wave in the medium corresponds to a wavelength which is substantially shorter than the size of the incident image and the extent of the motion therein.

23. A method as in claim 22 wherein the strain wave is caused by a transducer driven with an AC signal, and said electrical signal parameter is the phase of the electrical signal with respect to the AC signal driving the transducer.

24. A method as in claim 23 wherein said strain waves through the medium are at a single high frequency.

25. A method of detecting motion within an image and providing corresponding modification of electrical signals representing the image, comprising the steps of:

providing a medium having an electrical property which varies as a function of an image incident on the medium and as a function of strain disturbances in the medium;

causing the incidence of an image on the medium;

causing strain disturbances in the medium;

measuring the electrical property of the medium while said image is incident thereon and while the strain disturbances are present therein to derive a first electrical signal representing the image and a second electrical signal indicating motion of the image; and modifying said first electrical signal with said second electrical signal to thereby modify the first electrical signal in accordance with the motion of the image represented thereby.

26. A method as in claim 25 wherein said second electrical signal represents motion of the entire image with respect to the medium.

27. A method as in claim 26 wherein the modifying step corrects for relative motion between the image and the medium.

28. A method of scaling an image represented by an electrical signal, comprising the steps of:

providing a medium having an electrical property which varies as a function of an image incident on the medium and as a function of strain disturbances in the medium;

causing the incidence of an image on the medium;

causing strain disturbances in the medium;

measuring the electrical property of the medium while said image is incident thereon and while the strain disturbances are present therein to derive an electrical signal representing the image;

providing a selected constant; and modifying the electrical signal with said selected constant to correspondingly scale the image represented thereby.

29. A method as in claim 28 wherein the electrical signal has a phase and a magnitude component, and wherein the modifying step includes multiplying said components by a selected constant and its inverse respectively to scale the image represented by the electrical signal.

30. A method as in claim 28 wherein the combining step includes algebraically adding a selected constant to said electrical signal to thereby translate the image represented by the electrical signal.

31. A method of obtaining an electrical signal representation of an image comprising the steps of:

providing a substrate of a material capable of undergoing time-varying and space-varying strain disturbances;

disposing a first electrically conductive film on a surface of the substrate;

disposing a selected electrically isolating film on the first conductive film and a second electrically conductive film on the side of the isolating film facing away from the first conductive film, each of said film being acoustically coupled with the substrate to undergo strain disturbances therewith;

causing the incidence of an image on the junction between one of said conductive films and the isolating film;

causing strain disturbances in the substrate and in the films; and measuring an electrical property of said junction while said image is incident on it and while said strain disturbances are present in it to thereby derive an electrical signal representing the incident image.

32. A method of electronic processing of images, comprising the steps of:

providing a medium having an electrical property which varies as an image incident on the medium and as a function of strain disturbances in the medium;

causing the incidence of an image on the medium;

causing strain disturbances in the medium;

measuring the electrical property of the medium while said image is incident thereon and while the strain disturbances are present therein to derive an electrical signal representing the image, said electrical signal comprising a plurality of phase and magnitude values representative of Fourier series terms defining the image; and selectively modifying the image by selectively operating on said phase and magnitude values with selected operators.

33. A method of obtaining an electrical signal representing an image comprising the steps of:

providing a medium having an electrical property which varies as a function of an image incident on the medium and as a function of the square of strain disturbances in the medium;

causing the incidence of an image on the medium;

causing a plurality of strain waves simultaneously propagating in the medium, each strain wave propagating along a direction different from that of any other strain wave; and measuring the electrical property of the medium while said image is incident thereon and while said strain disturbances are present therein to derive an electrical signal representing the image.

34. A method of obtaining an electrical signal representing an image, comprising the steps of:

providing a first medium having an electrical property which varies as a function of an image incident on the medium and as a function of strain disturbances in the medium, and a second medium having an optical property which varies as a function of strain disturbances in the medium;

causing selected strain disturbances in the first medium and in the second medium;

modulating an original image with the optical property of the second medium, and causing the incidence of the resulting modulated image on the first medium; and measuring the electrical property of the first medium while the modulated image is incident thereon and while the strain disturbances are present therein to derive an electrical signal representing the original image.

35. A method as in claim 34 wherein the strain disturbances in the first and second media are along directions transverse to each other.

36. A method of obtaining an electrical signal representation of an image, comprising the steps of:

providing a medium having an optical property which varies as a function of strain disturbances in the medium and causing selected strain disturbances in the medium;

providing a device which generates an electrical signal corresponding to the intensity of a light image incident thereon; and passing an image through the medium to be modulated by said optical property thereof, causing the resulting modulated image to impinge on the device, and generating from the device an electrical signal representative of selected components of the Fourier transform of the image.

* * * * *